United States Patent [19]
Thurman et al.

[11] Patent Number: 5,613,106
[45] Date of Patent: Mar. 18, 1997

[54] METHOD FOR PROCESSING AND STORING A TRANSACTION IN A DISTRIBUTED DATABASE SYSTEM

[75] Inventors: Audree Thurman, Phoenix; Stan Person, Mesa; Ronald Norden-Paul, Mesa; Richard Shelton, Mesa, all of Ariz.

[73] Assignee: Motorola, Inc., Schaumburg, Ill.

[21] Appl. No.: 135,140

[22] Filed: Oct. 12, 1993

Related U.S. Application Data

[63] Continuation of Ser. No. 408,164, Sep. 15, 1989, abandoned.
[51] Int. Cl.⁶ ............................................... G06F 17/30
[52] U.S. Cl. .............. 395/620; 395/182.04; 395/182.11; 364/DIG. 1; 364/282.4
[58] Field of Search .................. 395/200.03, 182.04, 395/182.09, 182.11, 184.01, 600

[56] References Cited

U.S. PATENT DOCUMENTS

| | | | |
|---|---|---|---|
| 4,099,241 | 7/1978 | Ossfeldt | 364/200 |
| 4,358,823 | 11/1982 | McDonald et al. | 364/200 |
| 4,432,057 | 2/1984 | Daniell et al. | 364/200 |
| 4,562,539 | 12/1985 | Vince | 395/200.08 |
| 4,714,996 | 12/1987 | Gladney et al. | 395/600 |
| 4,751,639 | 6/1988 | Corcoran et al. | 364/200 |
| 4,751,702 | 6/1988 | Beier et al. | 364/200 |
| 4,839,806 | 6/1989 | Goldfischer et al. | 264/413.02 |
| 4,893,270 | 1/1990 | Beck et al. | 364/900 |
| 4,941,087 | 7/1990 | Kap | 364/200 |
| 4,949,251 | 8/1990 | Griffin et al. | 395/182.18 |
| 4,959,768 | 9/1990 | Gerhart | 364/187 |
| 5,005,174 | 4/1991 | Bruckert et al. | 395/575 |
| 5,079,740 | 1/1992 | Patel et al. | 395/575 |
| 5,084,816 | 1/1992 | Boese et al. | 395/575 |

OTHER PUBLICATIONS

John E. Brimm, MD, "Computers in Critical Care", Critical Care Nursing Quarterly 1987; 9(4):53–63.
Kim & Lochovsky, "Object–Oriented Concepts, Databases, and Applications", pp. 218–337 (1989).
Lyon, J., "Design Considerations in Replicated Database Systems for Disaster Protection", IEEE, May 1988, pp. 428–430.
Powell et al., "The Delta–4 Approach to Dependability in Open Distributed Computing Systems", IEEE, 1988, pp. 246–251.
Allan, Roger, "Technology Report For Fault–Tolerant Computing Software . . . ", Electronic Design, Oct. 31, 1985, pp. 110–117.
Bates et al., "Shadowing Boosts System Reliability", Computer Design, Apr. 1985 pp. 129–137.
"PDMS– Patient Data Management System – System Description" Hewlett Packard (Jan. 1982).
"PDMS– Patient Data Management System – Clinical User's Guide" Hewlett Packard (Jan. 1982).
"Ulticare – a bedside patient care information system", Health Data Sciences (Oct. 1984).

Primary Examiner—Thomas G. Black
Assistant Examiner—John C. Loomis
Attorney, Agent, or Firm—S. Kevin Pickens

[57] ABSTRACT

A transaction, consisting of a compilation of changes made to one or more data objects of a database, is transfered to a primary transaction engine of a primary database for processing. A copy of the transaction is sent by the primary transaction engine to a shadow transaction engine of a mirror database for processing in the local store. The transactions are then processed by the respective transaction engines. If the transaction is successfully processed by both transaction engines, the respective databases are updated from the local data store. If one of the transactions is not successfully processed, the system takes corrective action and optionally notifies the user.

11 Claims, 8 Drawing Sheets

METHOD FOR PROCESSING AND STORING A TRANSACTION IN A DISTRIBUTED DATABASE SYSTEM

This application is a continuation of prior application Ser. No. 07/408,164, filed Sep. 15, 1989 now abandoned.

RELATED INVENTIONS

The present invention is related to the following inventions, all assigned to the assignee of the present invention:

System Control Structure of a Hospital Information System and Method of Using Same, having Ser. No. 116,614, and filed on Nov. 3, 1987, now abandoned;

Clinical Task List with Charting Through the Task List onto Underlying Form and Automatic Updating of Task List, having Ser. No. 268,822, and filed on Nov. 7, 1989, now U.S. Pat. No. 5,077,666;

Clinical Task List with Charting onto Underlying Form and Automatic Updating of Task List, having Ser. No. 268,323, and filed on Nov. 7, 1987, now U.S. Pat. No. 5,072,383;

Method for Generating Patient-Specific Flowsheets by Adding/Deleting Parameters, having Ser. No. 116,611, and filed on Nov. 3, 1987 now U.S. Pat. No. 4,878,175;

Method for Generating a Display, having Ser. No. 322,740, and filed on Mar. 13, 1989, now abandoned, and continuation Ser. No. 07/540,382, now U.S. Pat. No. 5,208,907;

A Method for Displaying Information from an Information Based Computer System (Attorney Docket No. CR00046E), having Ser. No. 07/407,979 and filed on Sept. 15, 1989, now abandoned;

Spreadsheet Cell having Multiple Data Fields, having Ser. No. 07/408,166 and filed on Sep. 15, 1989, now U.S. Pat. No. 5,424,761;

A Method for Displaying Information from an Information Based Computer System (Attorney Docket No. CR00048E), having Ser. No. 07/407,836 and filed on Sep. 15, 1989, now U.S. Pat. No. 5,325,478.

Electronic Data Storage Interface, having Ser. No. 07/408,178 and filed on Sep. 15, 1989, now U.S. Pat. No. 5,253,361;

Method for Updating Data in a Database, having Ser. No. 07/408,167 and filed on Sep. 15, 1989, now abandoned.

A Method of Forming a Spreadsheet Display, having Ser. No. 07/407,972 and filed on Sep. 15, 1989, now abandoned; AND Data Storage Audit Trail, having Ser. No. 07/409,230 and filed on Sep. 15, 1989, now U.S. Pat. No. 5,301,319.

FIELD OF THE INVENTION

The present invention relates, in general, to a method of processing and storing transactions and, more particularly, to a method for processing and storing transactions in a distributed database system.

BACKGROUND OF THE INVENTION

The present invention relates to an automated records management system. Such an automatic system has utility, for example, in a hospital based patient record keeping system. Patient record keeping systems are used for maintaining a wide variety of separate, often interrelated, types of medical records concerning patients.

Hand written patient record keeping systems have evolved through many years of careful refinement and enhancement into systems which maintain a detailed manual record of medical information concerning each patient. To meet the needs of different hospital entities (such as doctors, nurses, pharmacy, accounting, laboratory, etc.) a manual record keeping system would require that one piece of information be entered into multiple records.

In a typical manual patient record keeping system a patient chart, usually in the form of a notebook, is maintained at the nursing station for each patient. The notebook is divided into a plurality of individual tabbed sections, such as Physicians Orders, Kardex, Nursing Care Plan, Nursing Assessment, and Laboratory.

Each of the above sections is further subdivided into a number of forms. The forms are those which are appropriate to the individual patient and/or such patient's physician. For example, within the Laboratory section there may appear forms for chemistry, hematology, blood gas, and microbiology.

In addition, a "flowsheet" chart is usually kept at the patient's bedside. On the "flowsheet" chart there are individual areas for medication records, vital signs, intake/output, laboratory results, and other categories which are dependent upon the patient's affliction, such as intravenous (IV) drips.

The flowsheets are often a type of spreadsheet arranged by a progression of time versus a particular parameter. Each of the time/parameter intersections form a cell.

One way of replacing the manual charting system is with electronic databases such as described in the patents and applications referenced in the preceding Related Inventions section. Here a visual display is provided in much the same configuration as present manual charts. Each display provides a time/variable spread sheet consisting of a plurality of data cells.

In this type of electronic database, a cell in a flowsheet may have a form or report associated with it which expands on the information in the cell. This form may be comprised of various attributes obtained from one or more object instances of one or more object classes.

An object instance is the instantiation of an object class. An object class is similar to a type (as used in programming languages) in that it defines a structure and a set of processing rules. The information for these flowsheet cells and the underlying forms, comes from a database containing various patient records. Examples of forms and records are found in copending patent applications "A Method of Forming a Spreadsheet Display" and "Spreadsheet Cell having Multiple Data Fields". During the patient's stay, the information in the database relating to that patient will grow and be physically distributed about the data storage device. Accessing and displaying this information becomes more difficult as the amount of information grows.

The functions provided by the present invention may also be considered a database management system which is a software application whose function is to interface between a database and any applications/processes requesting access to the database. In general, a database management system provides for the organization of, access to, and control of a database.

A database is a collection of logically organized data items. Generally, a database is organized into tables (or pages) which may contain one or more records (or rows). The records are comprised of one or more fields which contain the data.

A problem with databases is the possibility of the database becoming corrupted from soft failures in the storage medium or the database being totally lost from a catastrophic failure of the hardware, such as a head crash on a disk drive.

Another problem with existing databases is the use of data locks to prevent access to data while the data is being modified. This prevents other users from accessing the data while locked. This may also result in lock contention, or dead-lock.

Accordingly, it is an object of the present invention to provide a method for processing and storing a transaction in a distributed database system which overcomes the above deficiencies and provides the desired advantages.

A further object of the present invention is to provide a method for processing and storing a transaction in a distributed database system which provides a mirror database.

Another object of the present invention is to provide a method for processing and storing a transaction in a distributed database system which utilizes validity constraints to prevent multiple users from updating data at the same time, conceptually.

These and other objects and advantages are achieved in accordance with a preferred embodiment of the invention described below.

SUMMARY OF THE INVENTION

A particular embodiment of the present invention consists of a method for processing and storing a transaction in a distributed database system. A transaction consists of a compilation of changes made to one or more data objects of a database which are to be treated as a unit (i.e. if one change fails, the entire transaction fails). The transaction is transfered to a primary transaction engine of the database for processing in a local data store. While this activity is being conducted for the original database, the same steps are being conducted for a mirror database, a copy of the original. If both database updates are successful, the changes are committed to the respective databases. If one or the other updates fails, the system takes corrective action and optionally notifies the user.

DETAILED DESCRIPTION OF THE DRAWINGS

Before commencing the description of the invention, it is necessary to define some terms utilized in the present description. As used herein, changes (such as changes made to a data object) includes additions, allocations, modifications, deletions, updates, etc. Also as used herein, a transaction is a compilation of changes made to one or more data objects.

Figure 1:
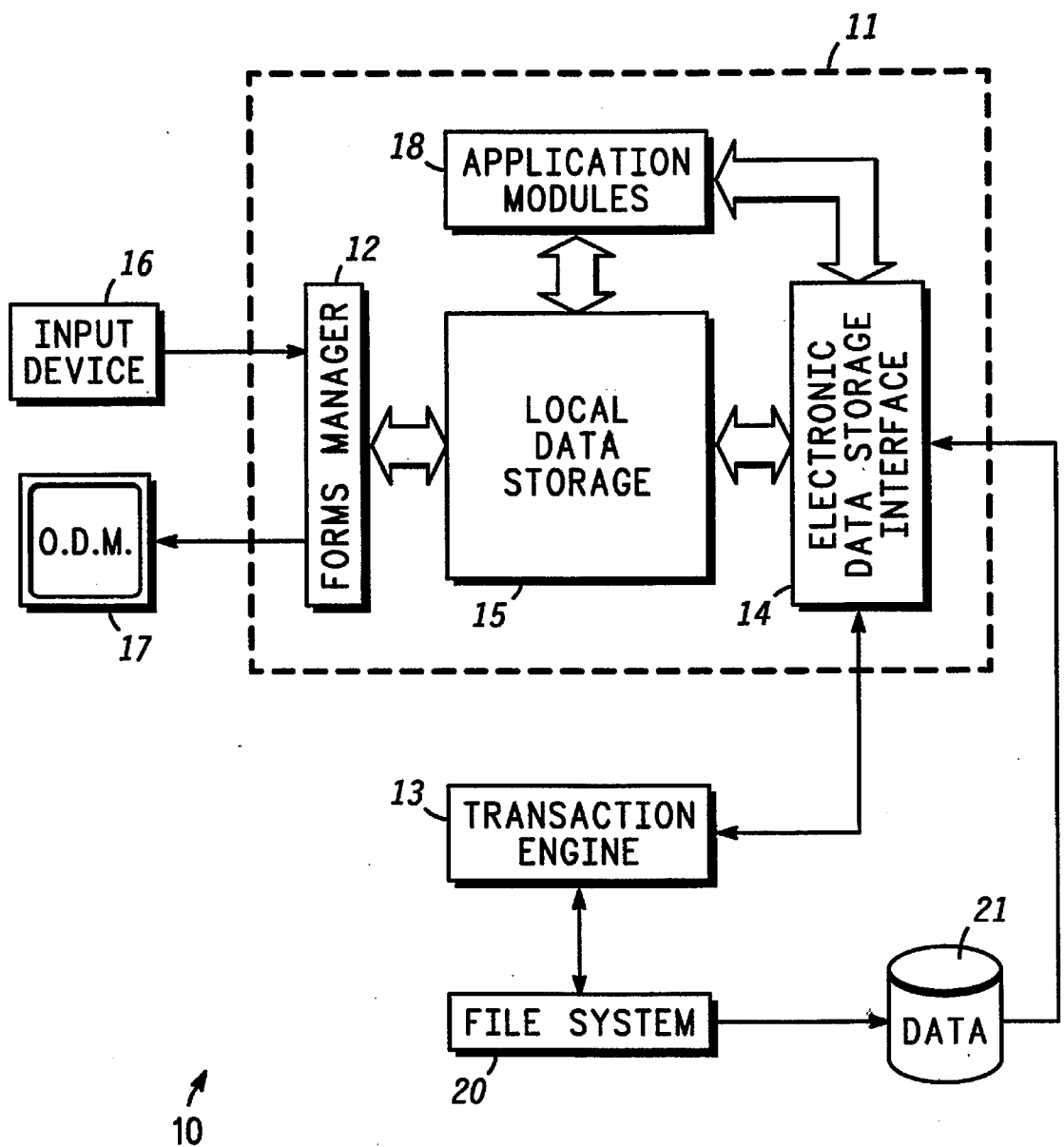
FIG. 1 is a block diagram representing the function of the present invention within a data processing system.

Referring initially to FIG. 1, a block diagram, generally designated 10, representing the function of the present invention within a data processing system is illustrated. A process 11 is designated by a dashed box and consists of a forms manager 12 (described in detail in copending patent application "Method for Generating a Display"), an electronic data storage interface 14 (described in detail in copending patent application "Electronic Data Storage Interface"), a local data storage 15, and application modules 18.

These various utilities interact with each other and with elements external to process 11. Some of the external elements consist of a transaction engine 13, of which the present invention is a part, an input device 16 (such as a keyboard, touch sensitive screen, light pen, mouse, or the like) and an operator display module 17 (such as a CRT, LCD display, gas plasma display, or the like). It is possible for input device 16 and ODM 17 to be one physical device, such as in the case of a touch sensitive screen.

In addition, a file system 20 is present to manage database 21. As will be described below, interface 14 interacts with file system 20, through transaction engine 13, to produce the data copied in local data storage 15.

Within database 21 are all object instances of object classes which have been instantiated. An object class is the definition of the structure of object instances of the object class and the hierarchical relationship of the object class with respect to other object classes. An object class is similar to a type (as used in programming languages). An object instance is an instantiation of an object class. An object instance is similar to a data item of a particular type. In this particular embodiment, an object instance consists of a row label and the time-dependent data associated therewith. An object class may have one or more object instances. The collection of object instances is a set of records. Object classes and object instances are described in more detail in copending patent application "Electronic Data Storage Interface".

When data is required by application 18, a message is sent to electronic data storage interface 14. Interface 14 then directs file system 20, through transaction engine 13, to provide a portion of the database 21 to interface 14. Interface 14 then places this data in local data storage 15. Storage 15 provides two basic functions. First, storage 15 acts as a scratch pad to perform changes before committing the changes to the main database. Second, it speeds up the interaction with the database by using only the portion of the database being changed and by placing this portion in semiconductor memory (such as a RAM) rather than working off of a disk drive.

After the desired portion of database 21 is copied to storage 15, the operator or application may begin the changes. Once the changes have been made, the system is directed to commit the changes to the database. Before committing the changes, the user may be required to perform a function such as signing the changes by providing some form of identification (such as a password or the like). To commit the changes, the changes are first consolidated into a single transaction.

The consolidation of the data change stream removes unnecessary changes and, when written to the database, results in memory space being saved.

The physical organization of the data in database 21 is described in copending patent application "Electronic Data Storage Interface".

Figure 2:
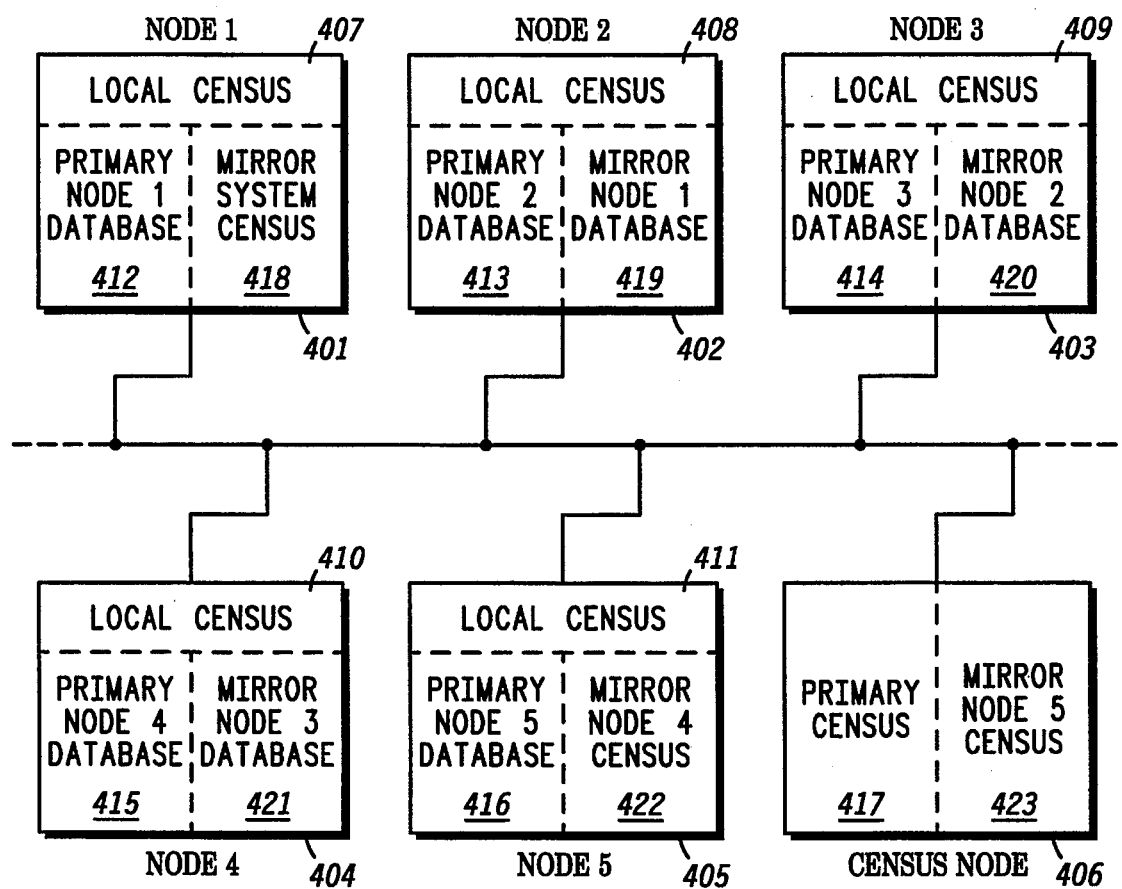
FIG. 2 shows a block diagram of a portion of a local area network.

Referring now to FIG. 2, a block diagram of a portion of a local area network, generally designated 400, containing a plurality of nodes 401–406 is illustrated. In the present example, each node represents a workstation in a hospital. As shown, each of the other nodes, 401–405, has a portion of a primary census 417 in their local census areas 407–411. This enables nodes 401–405 to function on their own in case census node 406 fails.

Each of nodes 401–406 contains a primary database 412–417, respectively, and a mirror, or backup, database 418–423 respectively. Each primary database has a corresponding mirror database. For example, primary node 2 database 413 on node 402 is identical to mirror node 2 database 420 on node 403. The updating of the primary node 2 database 413 and the mirror node 2 database 420 will be described in FIG. 6 below.

Figure 6:
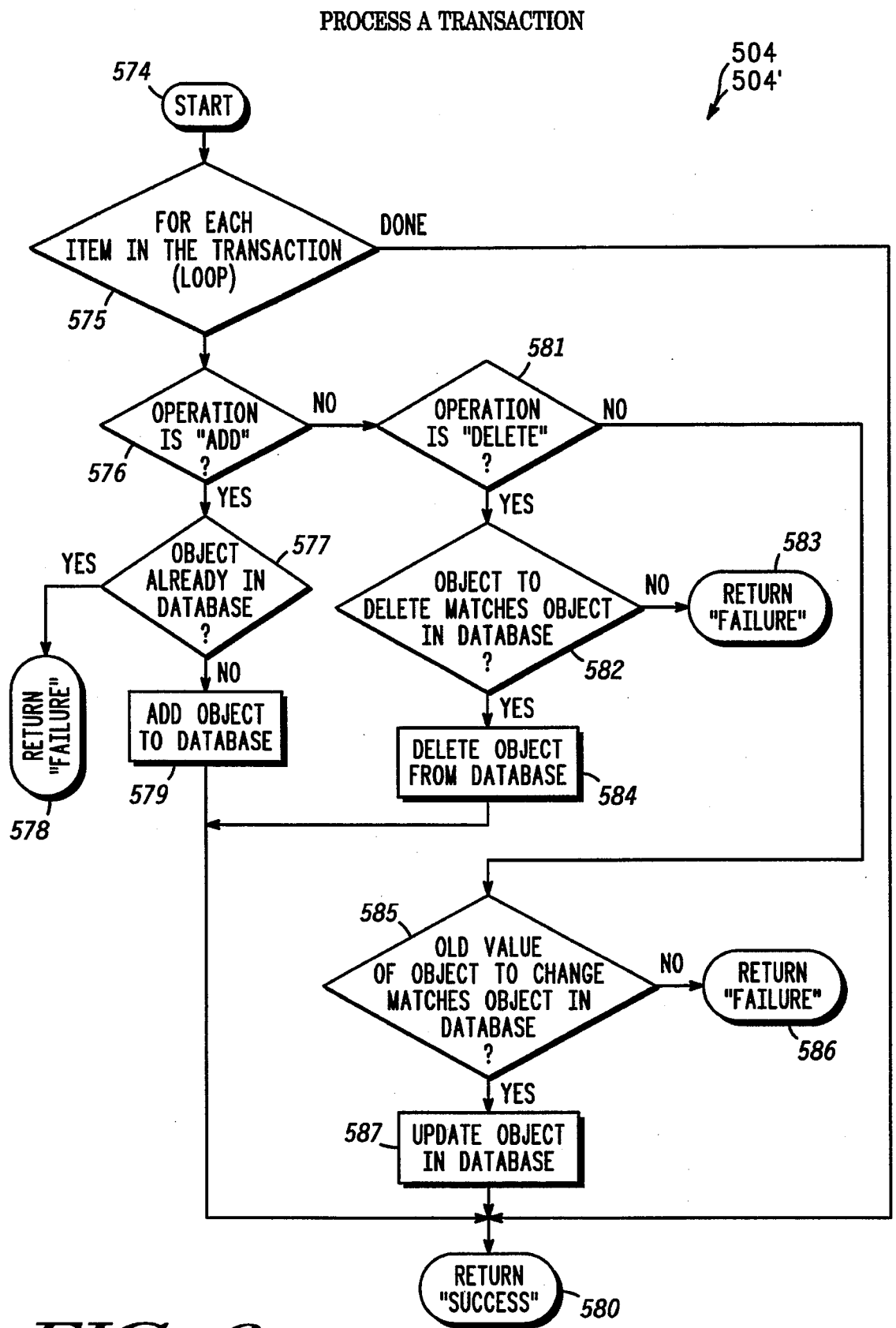
FIG. 6 is a block diagram of a flow chart, embodying the present invention, for processing a transaction in a transaction engine.

In FIG. 6, the updating of the node 2 primary database 413 and the node 2 mirror database 420 will be described.

Each node contains a pair of transaction engines (processes that directly manipulate the database file): a primary transaction engine and a shadow transaction engine. The primary transaction engines handle the updating of the primary databases on that node and the shadow transaction engine handles the updating of the mirror databases of the node. It should be noted that it is possible for a node to contain more than one primary or mirror database.

Figure 3:
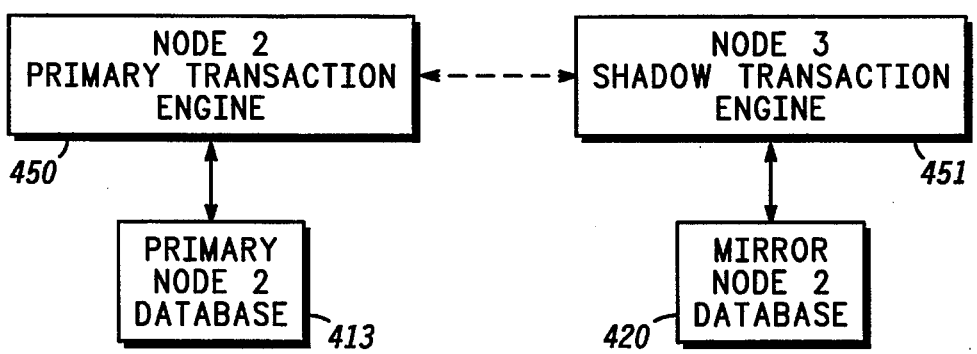
FIG. 3 shows a block diagram illustrating an example of the present invention.

Referring now to the block diagram of FIG. 3, an example of the method embodying the present invention is illustrated. When changes have been committed to the local cache (which contains data from the primary database of node 2) the transaction containing the changes is transmitted to primary transaction engine 450 of node 2. The primary transaction engine then forwards a copy of the transaction to shadow transaction engine 451 of node 3.

The transaction is then processed in parallel by transaction engines 450 and 451 on temporary files and the data in the temporary files is modified accordingly. If the processing of the transactions by both transaction engines is successful, the changes are committed to the database (i.e. the temporary files are copied into their respective primary/mirror databases and the temporary files are discarded). If the transaction processing on the primary database is unsuccessful, the changes are not committed and are discarded. The user is then notified that an error has occurred.

If the processing of the transaction in the mirror database is unsuccessful and the primary is successful, the changes to the mirror data base are discarded and the changes to the primary database are committed. The shadow would then relinquish control over the mirror database and send a message notifying the primary of the failure. When the primary receives the message from the shadow, the primary transaction engine will attempt to copy the primary database over the shadow database.

During the processing of the transaction, each change is subjected to validity constraints. The validity constraints prevent the database from becoming corrupted due to the writing of data to a single object from more than one application. This can occur, for example, when a doctor updates a patient's records from a work station in the doctor's lounge at the same time a nurse is updating the records from the patient's room. To prevent this dual writing, the transaction contains a copy of the object instance as it appeared before changing.

This copy is matched with the existing object instance. If the two are the same, the update is permitted. If the two are different, this indicates that the object instance has been updated by one application after it was read by a second application (which is now trying to update the object instance). When this occurs, the database is not updated and the user is notified.

Figure 4A:
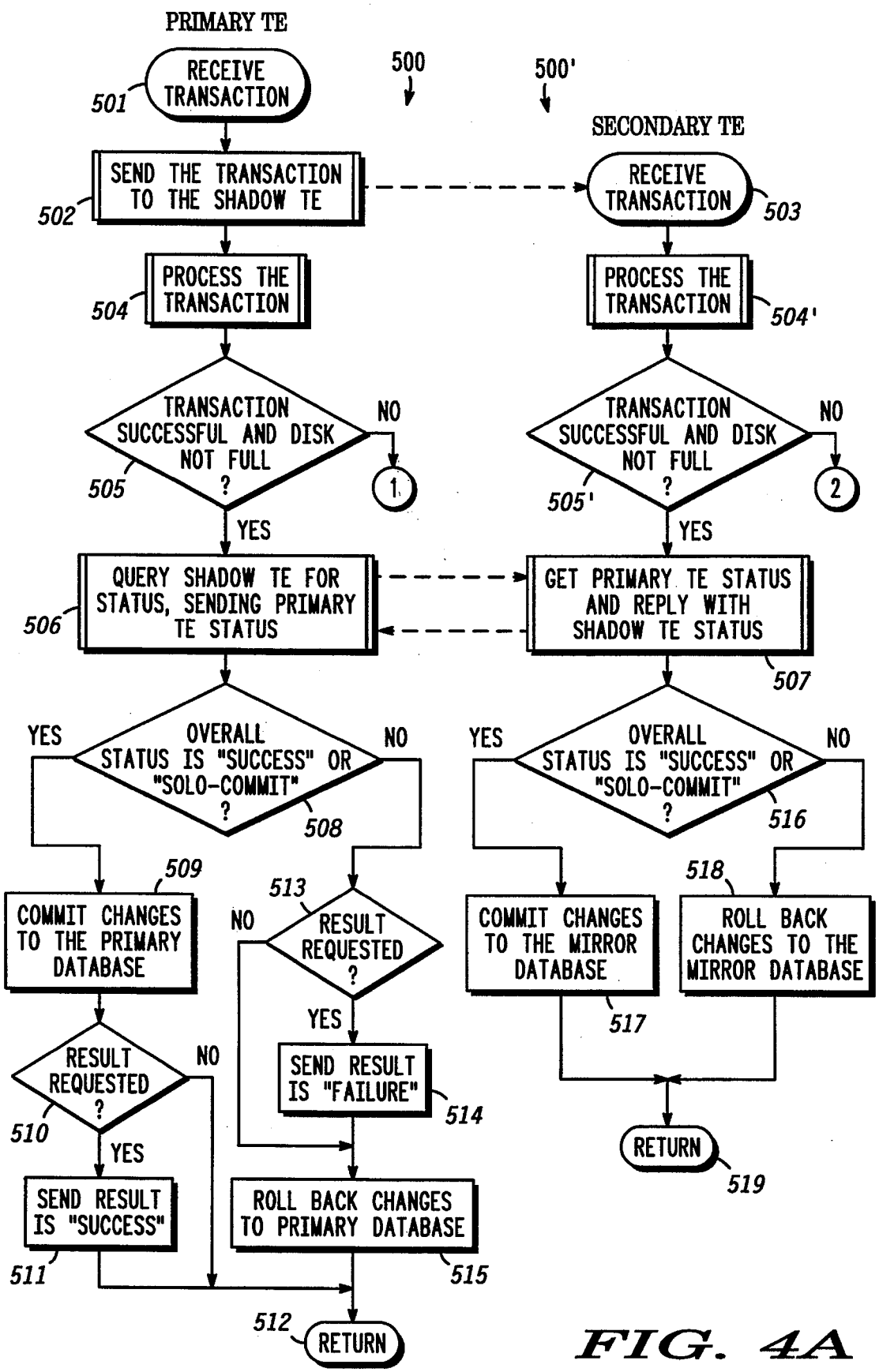
FIGS. 4A and 4B are block diagrams of a flow chart, embodying the present invention, for handling a transaction.
Figure 4B:
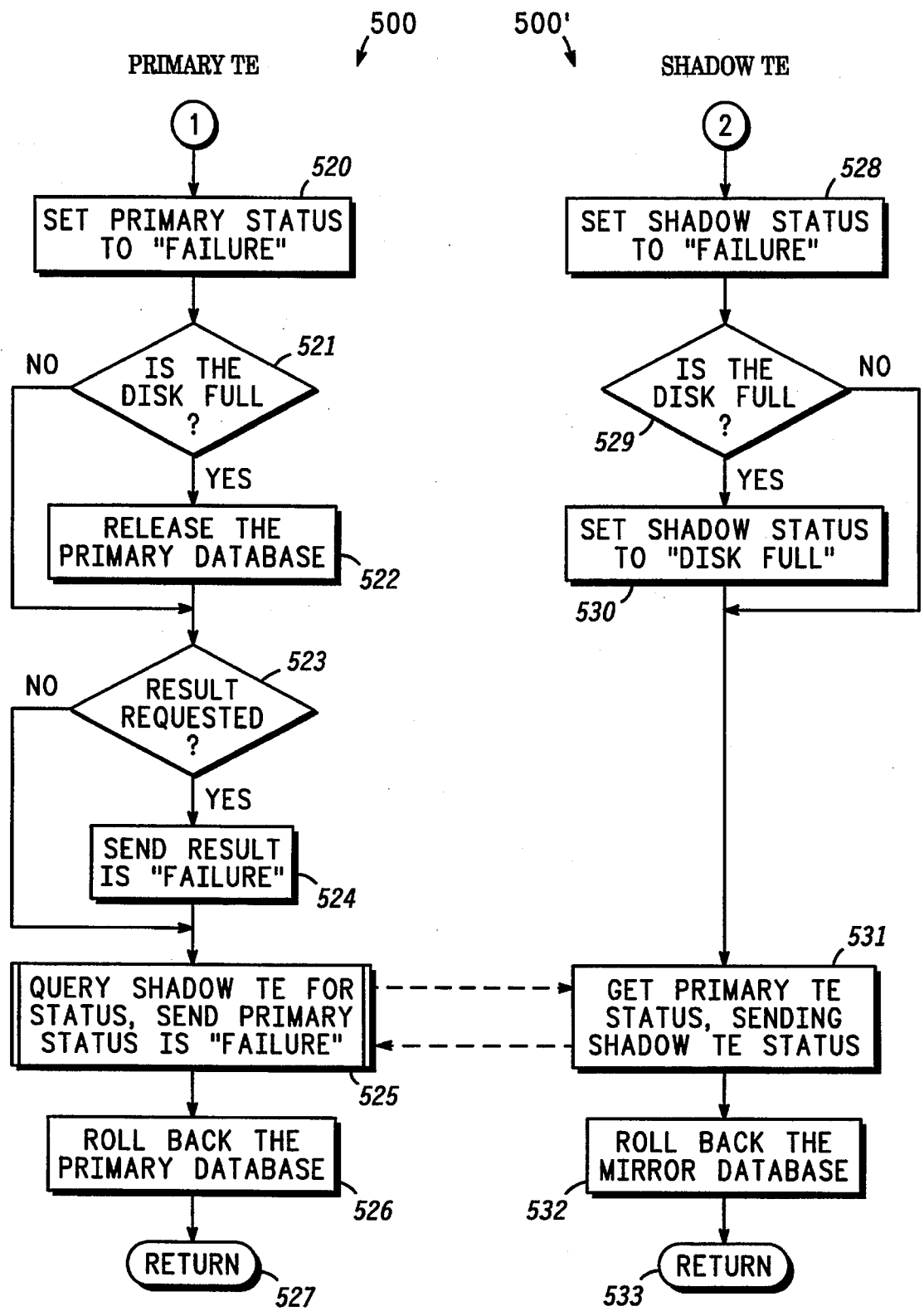

A flow chart, generally designated 500 for a primary transaction engine and 500' for a shadow transaction engine, describing the method of transaction processing by the transaction engines is illustrated in FIGS. 4A and 4B. Process 500 commences with the receipt of a transaction by the primary transaction engine, step 501. A copy of the transaction is then transmitted to the shadow transaction engine, subprocess 502 (shown in further detail in FIG. 5). The transaction is received by the shadow transaction engine at step 503.

Both transaction engines then process the transaction, subprocesses 504 and 504'. Subprocess 504 (504') is illustrated in FIG. 6. Following the transaction processing, the processes determine if the transaction was successfully processed and whether the disk is full, decisions steps 505 and 505'.

If the transaction processing in the primary transaction engine was successful and the disk was not full, the primary transaction engine sends its status and queries the shadow transaction engine, subprocess 506. Subprocess 506 is described in more detail in FIG. 7. If the transaction processing in the shadow transaction engine was successful and the disk was not full, the shadow transaction engine gets the status of the primary transaction engine and replies with a status message, subprocess 507. Subprocess 507 is described in more detail in FIG. 8.

Following subprocess 506, process 500 determines if the overall status was successful or if there was a solo commit (solo commit means that the primary was successful and the shadow failed), decision step 508. If the processing was successful or a solo commit, the changes are committed to the primary database, step 509. Process 500 then determines if the results were requested by the application submitting the transaction, decision step 510. If the results were requested, a "success" message is sent out, step 511. Following step 511, or if no results were requested, the process returns, step 512.

If the overall status was not a success and there was no solo commit, decision step 508, process 500 determines if the results were requested, decision step 513. If the results were requested, the subprocess sends a "failure" message, step 514. Following step 514, or if the results were not requested, the changes to the primary database are rolled back (i.e. deleted).

Following subprocess 507, process 500' determines if the overall status was successful, decision step 516. If the processing was successful, the changes are committed to the mirror database, step 517. If the overall status was not a success, the changes to the mirror database are rolled back.

Following step 517 or 518, process 500' returns, step 519.

If the transaction was not successful or the disk was full, decision step 505, process 500 sets the primary status to "failure", step 520, FIG. 4B. The process then determines if the disk was full, decision step 521. If the disk was full, the primary transaction engine releases the primary database, step 522.

Following step 522, or if the disk was not full, decisions step 521, the subprocess determines if results of the transaction processing were requested, decision step 523. If the results were requested, a "failure" message is returned, step 524.

Figure 7:
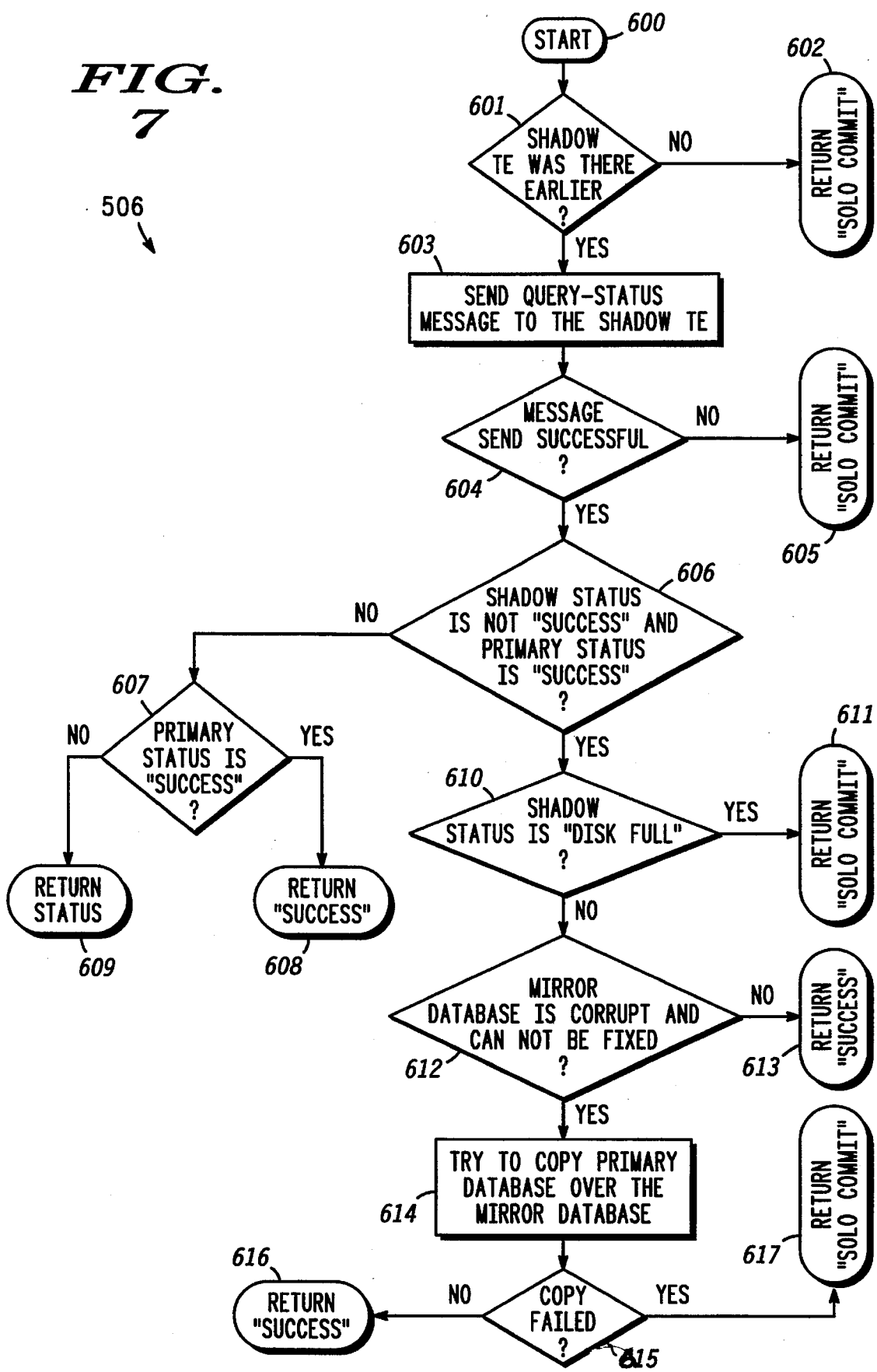
FIG. 7 is a block diagram of a flow chart, embodying the present invention, for querying a shadow transaction engine for its status.

If the results were not requested, decision step 523, or following step 524, the primary transaction engine queries the shadow transaction engine and sends a "failure" message, subprocess 525 (described in more detail in FIG. 7). Next, subprocess 500 rolls back the primary database, step 526, and returns, step 527.

If the transaction was not successful or the disk was full, decision step 505', process 500' sets the shadow status to "failure", step 528, FIG. 4B. The process then determines if the disk was full, decision step 529. If the disk was full, the shadow status is set to "disk full", step 530.

Following step 530, or if the disk was not full, decision step 529, the process gets the status of the primary transaction engine and replies with the status of the shadow transaction engine, subprocess 531. Subprocess 531 is described in more detail in FIG. 8.

Subprocess 500' then rolls back the mirror database, step 532, and returns, step 533.

Figure 5:
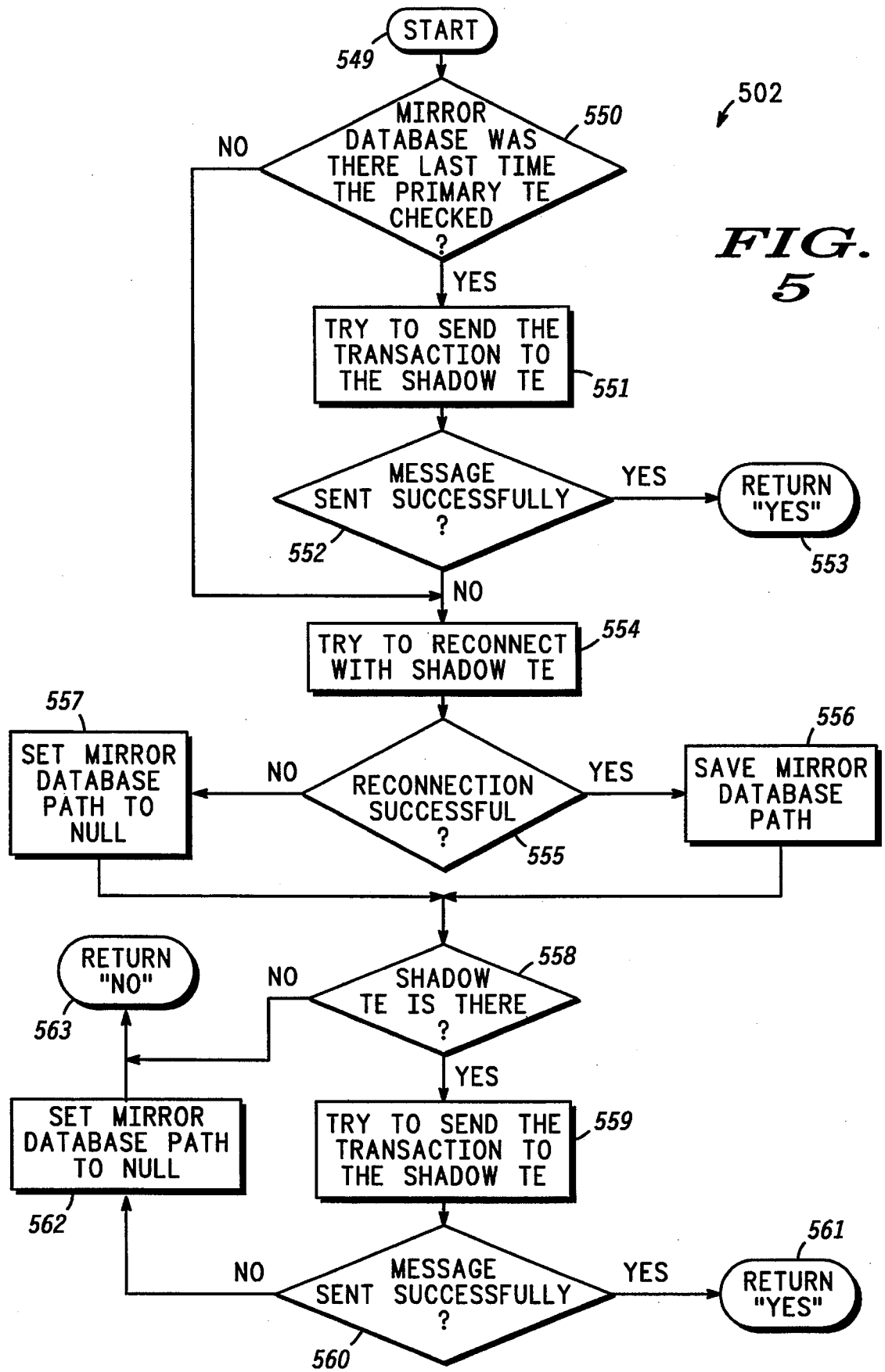
FIG. 5 is a block diagram of a flow chart, embodying the present invention, for sending a transaction from a primary transaction engine to a shadow transaction engine.

Referring now to FIG. 5, subprocess 502 is illustrated for sending a transaction to the shadow transaction engine. Pseudo code for this subprocess is provided in Appendix A. Subprocess 502 commences with step 549 then determines if the mirror database was available the last time the primary transaction engine checked, decision step 550. If the mirror database did exist, the subprocess then attempts to send the transaction to the shadow transaction engine, step 551. If the transaction was successfully sent, decision step 552, a "yes" result is returned, step 553.

If the mirror database was not available the last time primary transaction engine checked, decision step 550, or if the transaction was not successfully sent, decision step 552, the subprocess attempts to reconnect with the shadow transaction engine, step 554.

Following step 554, the subprocess determines if the the reconnection was successful. If the reconnection was successful, the subprocess saves the mirror database path, or address, step 556. If the reconnection was not successful, the subprocess sets the mirror database path to null, step 557.

Following either steps 556 or 557, the subprocess determines if the shadow transaction engine has been located, decision step 558. If the shadow transaction has been located, the primary transaction engine attempts to send the transaction to the shadow transaction engine, step 559.

The subprocess then determines if the transaction was successfully sent, decision step 560. If the transaction was successfully sent a "yes" result is returned, step 561. If the transaction was not successfully sent, the mirror database path is set to null, step 562.

Following step 562, or if the shadow transaction engine was not located, decision step 558, the subprocess returns a "no", step 563.

Referring now to FIG. 6, subprocess 504 (which is the same for subprocess 504') for processing a transaction, is illustrated. Pseudo code of this subprocess is provided in Appendix B. Subprocess 504 starts at step 574 and then starts a loop for each item in the transaction, step 575.

The subprocess then determines if the operation of the item is an "ADD", decision step 576. If the operation is an "ADD", the subprocess determines if the object is already in the database, decision step 577. If the object is already in the database, the subprocess returns a "failure" result, step 578. If the object is not already in the database, the subprocess adds the object to the database, step 579, and returns a "success" result, step 580.

If the operation is not an "ADD", decision step 581, the subprocess determines if the operation is a "DELETE", decision step 581. If the operation is a delete, the subprocess then determines if the object to be deleted matches the object in the database, decision step 582. If the object in the database does not match, subprocess 504 returns a "failure", step 583. If the object in the database does match the one to be deleted, the object in the database is deleted, step 584. Note: instead of deleting the object, the object may only be marked as deleted and left in the database. Following step 584, the subprocess returns a "success", step 580.

If the operation was not a "DELETE", decision step 581, then the subprocess determines if the old value of the object to be changed matches the object in the database, decision step 585. If the object does not match, the subprocess returns a "failure", step 586. If the object does match then the object in the database is updated, step 587, and a "success" result is returned, step 580.

Referring now to FIG. 7, subprocess 506 for querying the shadow transaction engine is illustrated. Pseudo code for this subprocess is provided in Appendix C. Starting at step 600, the subprocess then determines if the shadow transaction engine was found earlier in the process, decision step 601. If the shadow transaction engine was not found, the subprocess returns a "solo commit" message, step 602. If the shadow transaction engine was found, the subprocess sends a query status message to the shadow transaction engine, step 603.

Following step 603, subprocess 506 determines if the query message was successfully sent. If the query message was not successfully sent, then a solo commit is returned, step 605. If the query message was successfully sent, then the subprocess determines if the shadow transaction engine is not successful and if the primary transaction engine is successful, decision step 606.

If the conditions of decision step 606 are not met, the subprocess determines if the primary status is "success", decision step 607. If the primary status is "success", a "success" status is returned, step 608. If the primary status is not "success" the status of the primary is returned, step 609.

If the conditions of decision step 606 are met, subprocess 506 determines if the status of the shadow transaction engine is "disk full", decision step 610. If the status is "disk full", a "solo commit" status is returned, step 611.

If the status of the shadow transaction engine is not "disk full", the subprocess determines if the mirror database is corrupt and can't be fixed, decision step 612. If the conditions of decision step 612 cannot be met, a "success" message is returned, step 613.

If the conditions of decision step 612 are met, the subprocess attempts to copy the primary database over the mirror database, step 614. The subprocess then determines if the copy failed, decision step 615. If the copy did not fail, the subprocess returns "success", step 616. If the copy did fail, the subprocess returns "solo commit", step 617.

Figure 8:
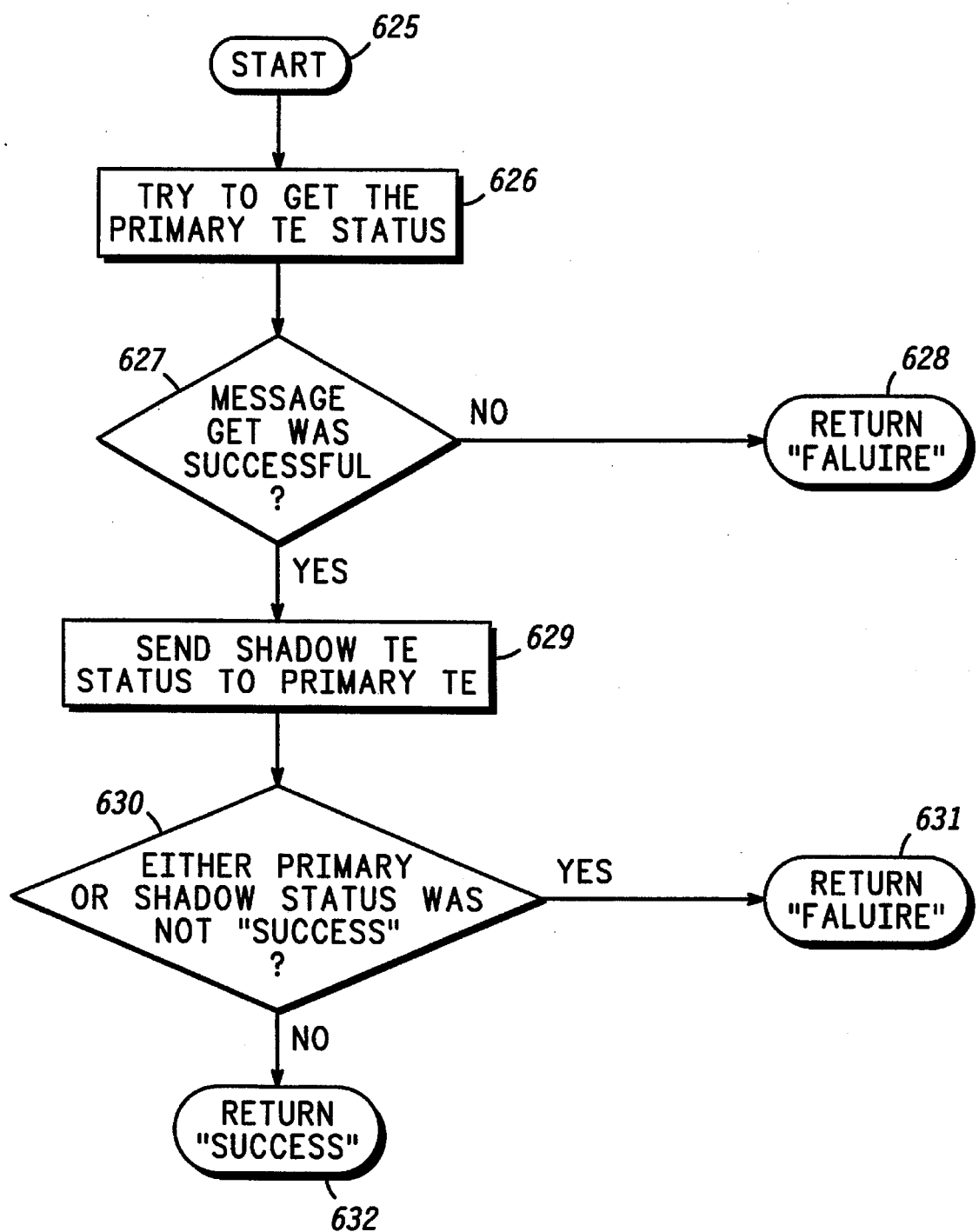
FIG. 8 is a block diagram of a flow chart, embodying the present invention, for replying to the query described in FIG. 7.

In FIG. 8, subprocess 507 for replying to the primary transaction engine is illustrated. Pseudo code for the subprocess if provided in Appendix D. Subprocess 507 starts with step 625 and then attempts to get the primary transaction engine's status, step 626.

The subprocess then determines if the attempt to get the status message was successful, decision step 627. If the attempt to get the message was not successful, the subprocess returns "failure", step 628. If the attempt to get the message was successful, the subprocess sends the status of shadow transaction engine to the primary transaction engine, step 629.

Next, in decision step 630, the subprocess determines if either the primary transaction engine or the shadow transaction engine was not successful. If one of the transaction engines was not successful, the subprocess returns a "failure" status, step 631. If both of the transaction engines were successful, the subprocess returns "success", step 632.

Therefore, a method has been shown which accomplishes the objective of processing and storing a transaction in a distributed database system which provides a mirror database.

Thus, it will be apparent to one skilled in the art that there has been provided in accordance with the invention, a method that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

PATENT
CR00116E

APPENDIX A

Send a Transaction to the Shadow TE

```
If the mirror database was there last time the primary TE
checked
    Try to send the transaction to the shadow TE.

If successful
        Return "yes."

Try to reconnect with the shadow TE.

If successful
    Save the mirror database path to indicate that the
    mirror is there.
Else
    Set the mirror database path to null to indicate that
    the mirror is not there.

If the mirror database is there
    Try to send the transaction to the mirror
    If successful
        Return "yes."
    Else
        Mirror has disappeared again - set mirror path
        to null.

Return "no."
```

PATENT
CR00116E

APPENDIX B

Process a Transaction

```
For each item in the transaction
    If the operation is "add"
        If the object is in database range (for time
        oriented data) and the object is not in the
        database yet
            Add the object to the database.
        Else
            Return failure.

Else if the operation is "delete"
        If the object to delete is in the database and
        hasn't been changed since the application
        decided to delete it (i.e. the object to be
        deleted is the same as the object the
        application thinks it's deleting)
            Delete the object from the database.
        Else
            Return failure.

Else (the operation is "update")
        If the object is in database range (for time
        oriented data) and the object is in the database
        and the object in the database hasn't been
        changed since the application decided to change
        it (i.e. the object to be changed is the same as
        the object the application thinks it's changing)
            Update the object in the database.
        Else
            Return failure.

Return success.
```

PATENT
CR00116E

APPENDIX C

Query Shadow TE (and send primary status)

```
If the mirror database wasn't there earlier (the mirror
path is null)
    Return "solo_commit."

Try to query the shadow TE for the status of the mirror
database.

If not successful
    Return "solo_commit."

If the mirror status is not "success" and the primary
status is "success"
    If the mirror database disk is full
        Return "solo_commit."
    Else
        If the mirror database is corrupt and can't be
        fixed
            Try to copy the primary database over the
            mirror database.

If the copy fails
                Return "solo_commit."
            Else
                Return "success."
        Else
            Return "success."
Else if the primary status is not "success"
    Return the primary status.
Else
    Return "success" (both succeeded).
```

PATENT
CR00116E

APPENDIX D

Reply to Primary TE

```
Try to get the status message from the primary TE.

If not successful
     Return "failure."

Send the mirror status to the primary TE.

If either the mirror status or the primary status are not
"success"
     Return "failure."
Else
     Return "success" (both succeeded).
```

We claim:

1. In a data processing system comprising:

a plurality of nodes communicating with one another over a network to which they are coupled;

a first one of said plurality of nodes comprising an input device, a primary database, a primary database transaction engine, and a local data store comprising primary temporary files each containing a subset of a plurality of data objects copied from said primary database;

a second one of said plurality of nodes comprising a mirror database, a mirror database transaction engine and a local data store comprising mirror temporary files each containing a subset identical to the subset of the plurality of data objects copied from said primary database;

a method for processing and storing a transaction, said transaction comprising at least one change made by a system user by means of said input device to one or more data objects in said local data store, said method comprising the steps of:

sending said transaction to said primary and mirror database transaction engines;

using said primary and mirror database transaction engines in parallel, processing identical copies of said transaction along with selected data objects from said respective primary and mirror temporary files of said local data store;

determining whether processing said transaction by said primary and mirror database transaction engines was successfully performed;

copying said primary temporary file to said primary database if and only if said processing of said transaction by said primary database transaction engine was successfully performed; and copying said mirror temporary file to said mirror database if and only if said processing of said transaction by said mirror database transaction engine was successfully performed and said step of copying said primary temporary file to said primary database was successfully performed.

2. The method of claim 1 further comprising the step of deleting said primary temporary file and said mirror temporary file if said processing by said primary database transaction engine was unsuccessfully performed.

3. The method of claim 1 further comprising the step of deleting said primary temporary file and said mirror temporary file if said step of copying said primary temporary file to said primary database.

4. The method of claim 1 further comprising the steps of:

deleting said mirror temporary file if said processing by said mirror database transaction engine was unsuccessfully performed;

communicating to said primary database transaction engine that the processing of said transaction by said mirror database transaction engine was unsuccessfully performed; and copying said primary database to said mirror database.

5. The method of claim 4 further comprising the step of indicating to said system user an indication of a failure by said mirror database transaction engine.

6. The method of claim 1 further comprising the steps of:

deleting said mirror temporary file if said step of copying said mirror temporary file to said mirror database was unsuccessfully performed;

communicating to said primary database transaction engine that the updating of said mirror database was unsuccessfully performed; and copying said primary database to said mirror database.

7. The method of claim 6 further comprising the step of indicating to said system user an indication of a failure by said mirror database transaction engine.

8. The method of claim 1 wherein said processing step comprises checking said primary database to determine if said one or more data objects are already contained in said primary database if said change made by said system user comprises the addition of a data object to said subset of data objects.

9. The method of claim 1 wherein said processing step comprises comparing the value of said one or more data objects in said transaction with the value of the identical one or more data objects in said primary database if said change made by said system user comprises the modification of said one or more data objects in said subset of data objects.

10. The method of claim 1 wherein said processing step comprises checking said primary database to determine if said one or more data objects are already Contained in said primary database if said change made by said system user comprises the deletion of a data object from said subset of data objects.

11. The method of claim 1 wherein said processing step comprises comparing the value of said one or more data objects in said transaction with the value of the identical one or more data objects in said mirror database if said change made by said system user comprises the modification or deletion of said one or more data objects in said subset of data objects.

* * * * *

UNITED STATES PATENT AND TRADEMARK OFFICE
CERTIFICATE OF CORRECTION

PATENT NO. : 5,613,106
DATED : March 18, 1997
INVENTOR(S) : Audree Thurman et al.

It is certified that error appears in the above-indentified patent and that said Letters Patent is hereby corrected as shown below:

In column 19, claim 3, line 49, insert --was unsuccessfully performed--.

Signed and Sealed this

Twenty-first Day of October 1997

Attest:

BRUCE LEHMAN

*Attesting Officer*  *Commissioner of Patents and Trademarks*